US011866087B2

(12) United States Patent
Ponikiewski et al.

(10) Patent No.: US 11,866,087 B2
(45) Date of Patent: Jan. 9, 2024

(54) STEERING COLUMN ASSEMBLY FOR A VEHICLE

(71) Applicant: ZF Steering Systems Poland Sp. Z.o.o., Czechowice-Dziedzice (PL)

(72) Inventors: Pawel Ponikiewski, Pewel Mala (PL); Damian Uchyla, Strumień (PL); Artur Wojtalik, Katowice (PL); Radoslaw Szymoszek, Cieszyn (PL); Marcin Brzoska, Zabrzeg (PL)

(73) Assignee: ZF Steering Systems Poland Sp. Z.o.o., Czechowice-Dziedzice (PL)

( * ) Notice: Subject to any disclaimer, the term of this patent is extended or adjusted under 35 U.S.C. 154(b) by 0 days.

(21) Appl. No.: 17/880,896

(22) Filed: Aug. 4, 2022

(65) Prior Publication Data
US 2023/0043788 A1    Feb. 9, 2023

(30) Foreign Application Priority Data

Aug. 9, 2021 (EP) ........................... 21461576
Sep. 3, 2021 (GB) ........................... 2112599

(51) Int. Cl.
*B62D 1/181* (2006.01)
*B62D 1/185* (2006.01)

(52) U.S. Cl.
CPC ............. *B62D 1/181* (2013.01); *B62D 1/185* (2013.01)

(58) Field of Classification Search
CPC ................................. B62D 1/181; B62D 1/185
See application file for complete search history.

(56) References Cited

U.S. PATENT DOCUMENTS 5,036,720 A * 8/1991 Shirasawa ............... B62D 1/181
                                                           74/89.42
5,178,411 A * 1/1993 Fevre ....................... B62D 1/181
                                                            280/775

(Continued)

FOREIGN PATENT DOCUMENTS

CN    201291895 Y    8/2009
DE    102020129216 A1    5/2021

(Continued)

*Primary Examiner* — Drew J Brown
(74) *Attorney, Agent, or Firm* — Kristin L. Murphy

(57) ABSTRACT

A steering column assembly is disclosed that comprises: a housing having outer, intermediate and inner elongate, telescopically mounted housing portions movable relative to one another along an adjustment axis; a steering column rotatably mounted in the inner elongate housing portion and being configured at one end for attachment of a steering member (e.g. a steering wheel); a leadscrew rotatably mounted on the intermediate housing portion and having first and second threaded portions of opposite handedness; a motor for rotating the leadscrew; a first displacement member screw-threadedly mounted to the first threaded portion of the leadscrew and connected to one of the outer and inner elongate housing portions; and a second displacement member screw-threadedly mounted to the second threaded portion of the leadscrew and connected to the other of the outer and inner elongate housing portions; whereby rotation of the leadscrew causes displacement of the first and second displacement members in opposite directions along the adjustment axis.

18 Claims, 10 Drawing Sheets

(56) References Cited

U.S. PATENT DOCUMENTS

| | | | | |
|---|---|---|---|---|
| 6,079,743 A * | 6/2000 | Grams | ............... | B62D 1/181 |
| | | | | 280/775 |
| 6,142,523 A * | 11/2000 | Bathis | ............... | B62D 1/181 |
| | | | | 280/777 |
| 7,159,904 B2 * | 1/2007 | Schafer | ............... | B62D 1/181 |
| | | | | 280/775 |
| 8,161,839 B2 * | 4/2012 | Warashina | ............ | B62D 1/181 |
| | | | | 74/493 |
| 9,260,130 B2 * | 2/2016 | Mizuno | ............... | B62D 1/187 |
| 10,228,047 B2 * | 3/2019 | Nunez | ............... | F16H 25/20 |
| 10,577,010 B2 * | 3/2020 | Derocher | ............ | B62D 1/183 |
| 2007/0137381 A1 * | 6/2007 | Arihara | ............... | B62D 1/181 |
| | | | | 280/775 |
| 2017/0363189 A1 * | 12/2017 | Nunez | ............... | F16H 25/2006 |
| 2019/0210633 A1 | 7/2019 | Derocher et al. | | |
| 2021/0061340 A1 * | 3/2021 | Wilkes | ............... | B62D 1/185 |
| 2022/0324505 A1 * | 10/2022 | Ku | ............... | B62D 1/185 |

FOREIGN PATENT DOCUMENTS

| | | |
|---|---|---|
| DE | 102020206740 A1 | 12/2021 |
| WO | 2021172865 A1 | 9/2021 |

* cited by examiner

STEERING COLUMN ASSEMBLY FOR A VEHICLE

CROSS-REFERENCE TO RELATED APPLICATION

This application claims priority to European Patent Application No. 21461576.7, filed Aug. 9, 2021 and GB Patent Application No. 2112599.2, filed Sep. 3, 2021, the disclosure of which is incorporated herein by reference in its entirety.

TECHNICAL FIELD

The present disclosure relates to steering column assemblies for motor vehicles and in particular, but not exclusively, to retractable steering column assemblies for autonomous vehicles.

BACKGROUND

Autonomous vehicles are intended to be used primarily in autonomous mode, in which control of the vehicle is carried out without manual intervention. However, it is desirable for autonomous vehicles to be controllable manually if necessary or desired, and for that reason vehicle controls such as a steering wheel (typically having a "steer-by-wire" operation) must be provided. It is desirable for the steering wheel of such autonomous vehicles to be moveable into a stowed condition during autonomous control of the vehicle in order to maximise the space available within the vehicle and for the steering wheel to be moveable into an extended, deployed condition for manual control.

In addition, when the steering wheel is in the extended, deployed condition it is desirable to be able to adjust the position of the steering wheel for the comfort and safety of the driver.

SUMMARY

In accordance with the present disclosure, a steering column assembly comprises:
  a housing having outer, intermediate and inner elongate, telescopically mounted housing portions movable relative to one another along an adjustment axis;
  a steering column rotatably mounted in the inner elongate housing portion and being configured at one end for attachment of a steering member;
  a leadscrew rotatably mounted on the intermediate housing portion and having first and second threaded portions of opposite handedness;
  a motor for rotating the leadscrew;
  a first displacement member screw-threadedly mounted to the first threaded portion of the leadscrew and connected to one of the outer and inner elongate housing portions; and
  a second displacement member screw-threadedly mounted to the second threaded portion of the leadscrew and connected to the other of the outer and inner elongate housing portions;
  whereby rotation of the leadscrew causes displacement of the first and second displacement members in opposite directions along the adjustment axis.

The steering column assembly in accordance with the present disclosure has a simpler construction fewer components and a lower cost as compared with the prior art steering column assemblies. The actuating mechanism for the steering column assembly has a compact size and the whole mechanism is only slightly longer than its reach movement range.

By adjusting the characteristics of various components, the steering column assembly can be quickly redesigned for a desired reach adjustment range or speed.

In addition, the use of a single leadscrew to which the first and second displacement members are screw-threadedly mounted results in reduced bending of the mechanism during a crash, as the mechanism lies in one axis.

The simplicity of the design also allows the motor to be positioned in different orientations, to suit the available space within a vehicle.

In one exemplary arrangement, the leadscrew comprises a first, externally threaded portion and a second, internally threaded portion.

The second displacement member may comprise an externally threaded rod screw-threadedly engaged with the second, internally threaded portion of the leadscrew.

In one exemplary arrangement, the threaded rod is prevented from rotating.

In one exemplary arrangement, the steering column assembly further comprises a second motor for rotating the externally threaded rod.

By actuating the first and second motors simultaneously, a significantly faster movement of the steering column assembly can be achieved. This can be useful in the event of an autonomous mode, in which only a very short period of time is available to switch to manual driver control. It can also be used as part of a passive safety system in which the steering column is rapidly moved away from the driver immediately prior to a crash in order to reduce load on the driver and minimised injuries. It is also useful to provide more space for the driver to get in and out of the vehicle. Furthermore, the use of two motors provides an element of redundancy in that even if one motor is broken the other can provide a partial reach adjustment function (e.g. after a crash, in order to facilitate evacuation).

In one exemplary arrangement, the second motor is mounted on the elongate housing portion to which the threaded rod is connected.

The first displacement member may comprise an internally threaded member mounted on an externally threaded portion of the leadscrew.

In one exemplary arrangement, the leadscrew comprises first and second externally threaded portions.

The first displacement member may comprise an internally threaded member mounted on the first externally threaded portion of the leadscrew and the second displacement member may comprise an internally threaded member mounted on the second externally threaded portion of the leadscrew.

In one exemplary arrangement, the steering column assembly further comprises a gear arrangement connecting the output of the motor to the leadscrew.

The motor may be connected to the gear arrangement and the gear arrangement may be secured to the intermediate housing portion.

In one exemplary arrangement, the leadscrew extends parallel to the adjustment axis of the telescopic housing.

In one exemplary arrangement, the steering column assembly further comprises a securing arrangement for securing the outer housing portion to a vehicle.

The present disclosure also includes vehicle comprising a steering column assembly in accordance with the present disclosure.

BRIEF DESCRIPTION OF DRAWINGS

By way of example only, specific exemplary arrangements of the present disclosure will now be described with reference to the accompanying drawings, in which.

DETAILED DESCRIPTION

Figure 1:
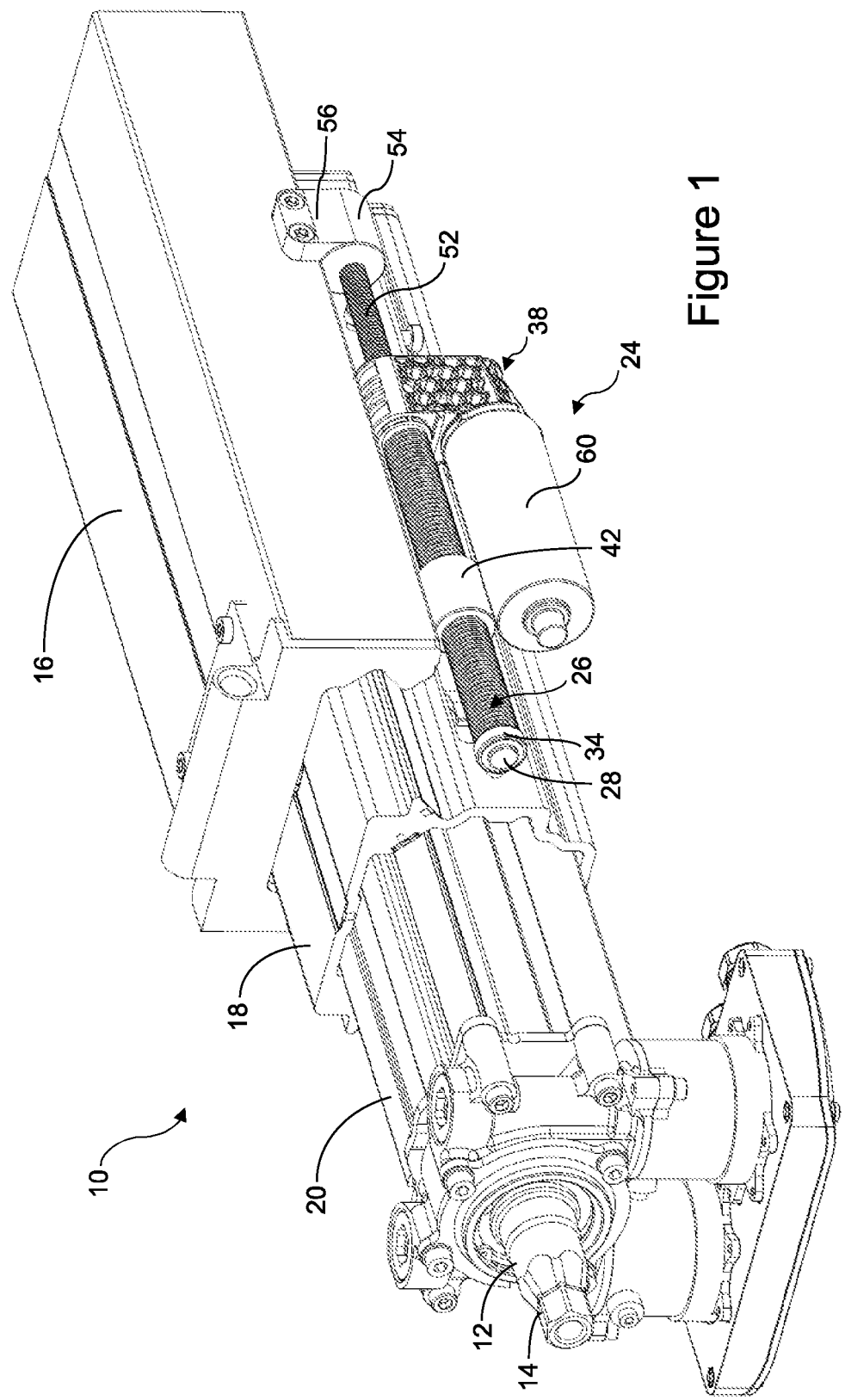
FIG. 1 is a perspective view of a first exemplary arrangement of steering column assembly for a vehicle in accordance with the present disclosure, shown in a partially retracted condition.

A first exemplary arrangement of steering column assembly 10 for a vehicle in accordance with the present disclosure is shown in FIGS. 1 to 6. The steering column assembly 10 is telescopically adjustable along a longitudinal axis A-A (best seen in FIG. 3) which is coincident with a rotational axis of an elongate steering column 12, to an outer end 14 of which a steering wheel (omitted from the drawings for clarity) is attached in use.

The telescopic steering column assembly 10 comprises an outermost elongate housing portion ("tube") 16 which slidably and telescopically receives an intermediate elongate housing portion ("tube") 18 which in turn slidably and telescopically receives an innermost elongate housing portion ("tube") 20. In use, the outermost elongate tube 16 is secured to the vehicle into which the steering column assembly 10 is to be installed (e.g. to a cross bar beam of the vehicle). The elongate steering column 12 is rotatably mounted within the innermost elongate tube 20 and the relative positions of the outermost, intermediate and innermost tubes 16, 18, 20—and therefore the position of a steering wheel attached to the end 14 of the steering column 12—can be adjusted by displacing the tubes with respect to one another along the axis A-A, as will be explained. A steering column turn sensor and a torque feedback motor (not visible) are mounted to the steering column 12 near its inner end within the innermost tube 20, to measure a rotational position of the steering column 12 and to provide a feedback force to the driver in order to provide a sensation of "road feel".

A mechanism 24 for displacing the outermost, intermediate and innermost tubes 16, 18, 20 is shown in more detail in FIGS. 3 to 6. The mechanism 24 comprises an elongate, straight leadscrew 26 having a front end 28 and a rear end 30 and whose exterior is provided with a helical screw thread 32. An annular, resiliently deformable end stop 34 (e.g. made from rubber) is mounted at the front end 28 of the leadscrew and the rear end 30 of the lead screw is rotatably mounted in a tubular recess 36 of a gearbox housing 38. A displacement member in the form of an internally threaded sleeve or collar 42 (commonly referred to as a "nut") is screw-threadedly mounted on the helical screw thread and has a laterally extending lug 44 which passes through a longitudinally extending slot (not visible) in the side of the intermediate tube 18, and by which the threaded sleeve is attached to the innermost tube 20. The gearbox housing 38 is attached to a mounting plate 46 which in turn is securely attached to the intermediate tube 18 by two securing bolts 48.

Figure 5:
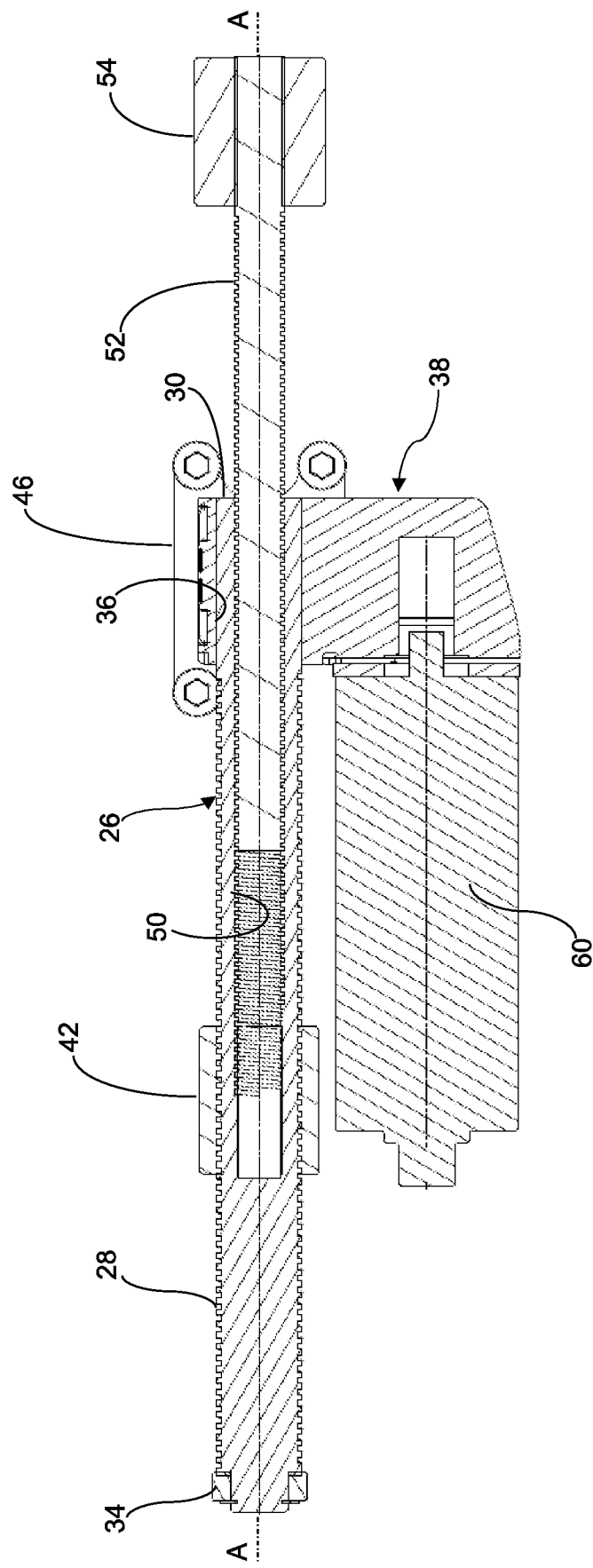
FIG. 5 is a vertical cross-section through the adjustment mechanism of FIG. 2.
Figure 6:
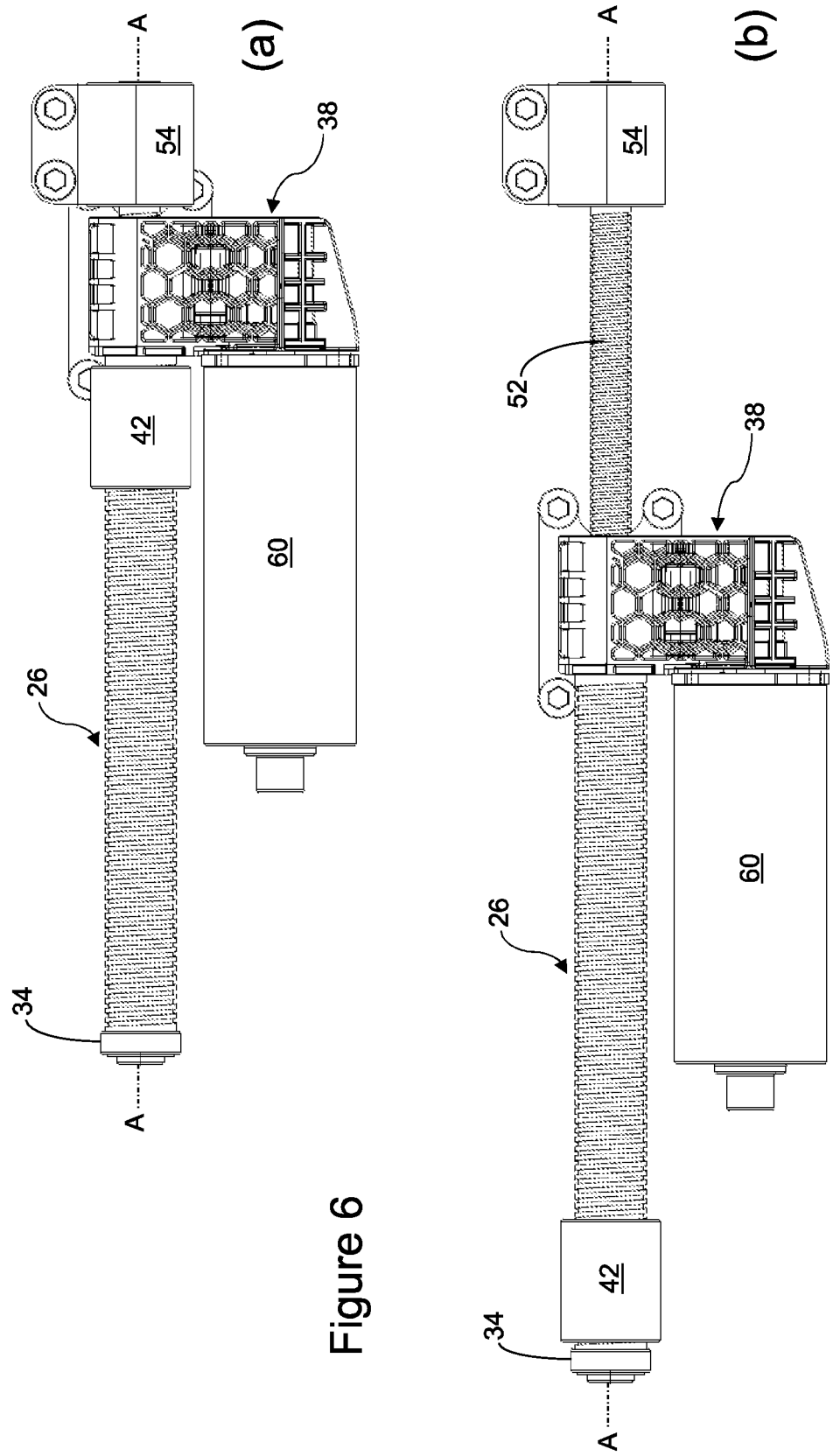
FIGS. 6 (a) and (b) are side views of the adjustment mechanism of FIG. 2, shown in the fully retracted/withdrawn condition and fully extended/deployed condition respectively.

As best seen in FIG. 5, the leadscrew 26 is provided with an internally threaded bore 50 whose longitudinal axis coincides with the longitudinal axis A-A of the leadscrew 26 and which extends from the rear end 30 for approximately two thirds of the length of the leadscrew. An elongate externally threaded bar 52 is screw-threadedly received in the internal threaded bore 50 of the leadscrew and a displacement member in the form of a tubular collar or sleeve 54 (commonly referred to as a "nut") is fixedly secured to its outer end. The collar 54 has an upwardly projecting securing lug 56 and is attached to the outermost tube 16 by means of two securing bolts 58 passing through the securing lug 56.

The screw-threaded connection between the threaded bar 52 and the internal threaded bore 50 of the leadscrew 26 is oppositely-handed to the screw-threaded connection between the sleeve 42 and the external helical thread 32 of the leadscrew 26 (i.e. one is a right-handed screw thread and the other is a left-handed screw thread), so that as the leadscrew 26 is rotated, the threaded bar 52 and the sleeve 42 will be displaced in opposite directions.

An electric motor 60 is secured to the gearbox housing 38 and is arranged to rotate the leadscrew 26 via the gearbox 38, as will be explained. In one exemplary arrangement, the gearbox housing 38 has a honeycomb structure to reduce its weight, the amount of material required and to improve cooling.

As mentioned previously, (a) the threaded sleeve 42 which is screw-threadedly mounted on the external thread 32 of the leadscrew 26 is secured to the innermost tube 20, (b) the gearbox 38 is secured to the intermediate tube 18 and (c) the tubular collar 54 at the outer end of the externally threaded bar 52 is secured to the outermost tube 16. The threaded sleeve 42 and the tubular collar 54 (and the threaded bar 52 which is rigidly attached to the tubular collar 54) are thereby prevented from rotating. Consequently, as the motor 60 is operated in a first direction, the threaded sleeve 42 moves along the leadscrew 26 towards the end stop 34 and the threaded bar 52 is displaced in the opposite direction away from the gearbox 38, thereby also displacing the tubular collar 54 which is rigidly attached to the threaded bar 52, to a maximum extended displacement as illustrated in FIG. 6(b). Conversely, as the motor 60 is operated in the opposite direction, the threaded sleeve 42 moves along the leadscrew 26 away from the end stop 34 and the threaded bar 52 and the tubular collar 54 which is rigidly attached to it are drawn towards the gearbox 38, to a minimum withdrawn displacement as illustrated in FIG. 6(a). The outermost tube 16 is secured to the vehicle, and therefore operation of the motor causes the intermediate tube 18 to telescope in and out of the outermost tube 16 and simultaneously causes the innermost tube 20 to telescope in and out of the intermediate tube 18, between a maximum withdrawn condition in which the mechanism 24 assumes the configuration of FIG. 6(a) and a maximum extended condition in which the mechanism 24 assumes the configuration of FIG. 6(b).

The position of the steering column 12, and therefore of the steering wheel which is connected to the steering column 12 in use, can be adjusted between a withdrawn, stowed condition (suitable for autonomous operation of a vehicle) and an extended, deployed condition (suitable for manual control of a vehicle). The position of the steering wheel in the extended, deployed condition can also be adjusted to suit the driver of the vehicle.

Figure 2:
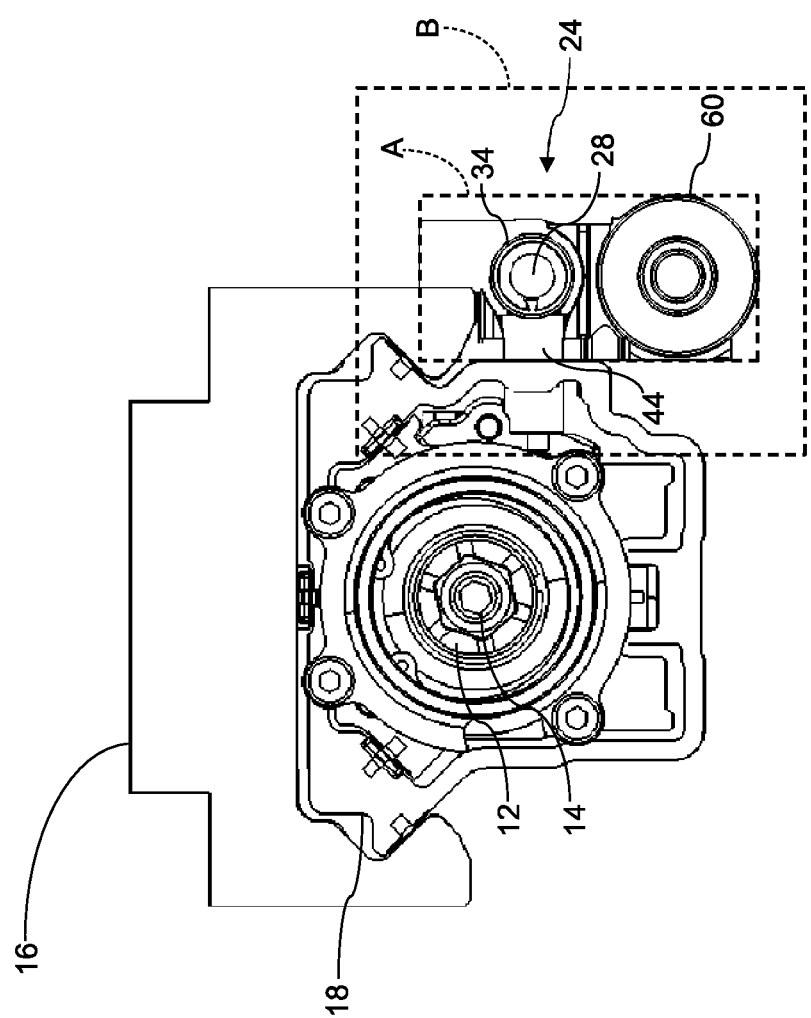
FIG. 2 is a front view of the steering column assembly of FIG. 1.
Figure 3:
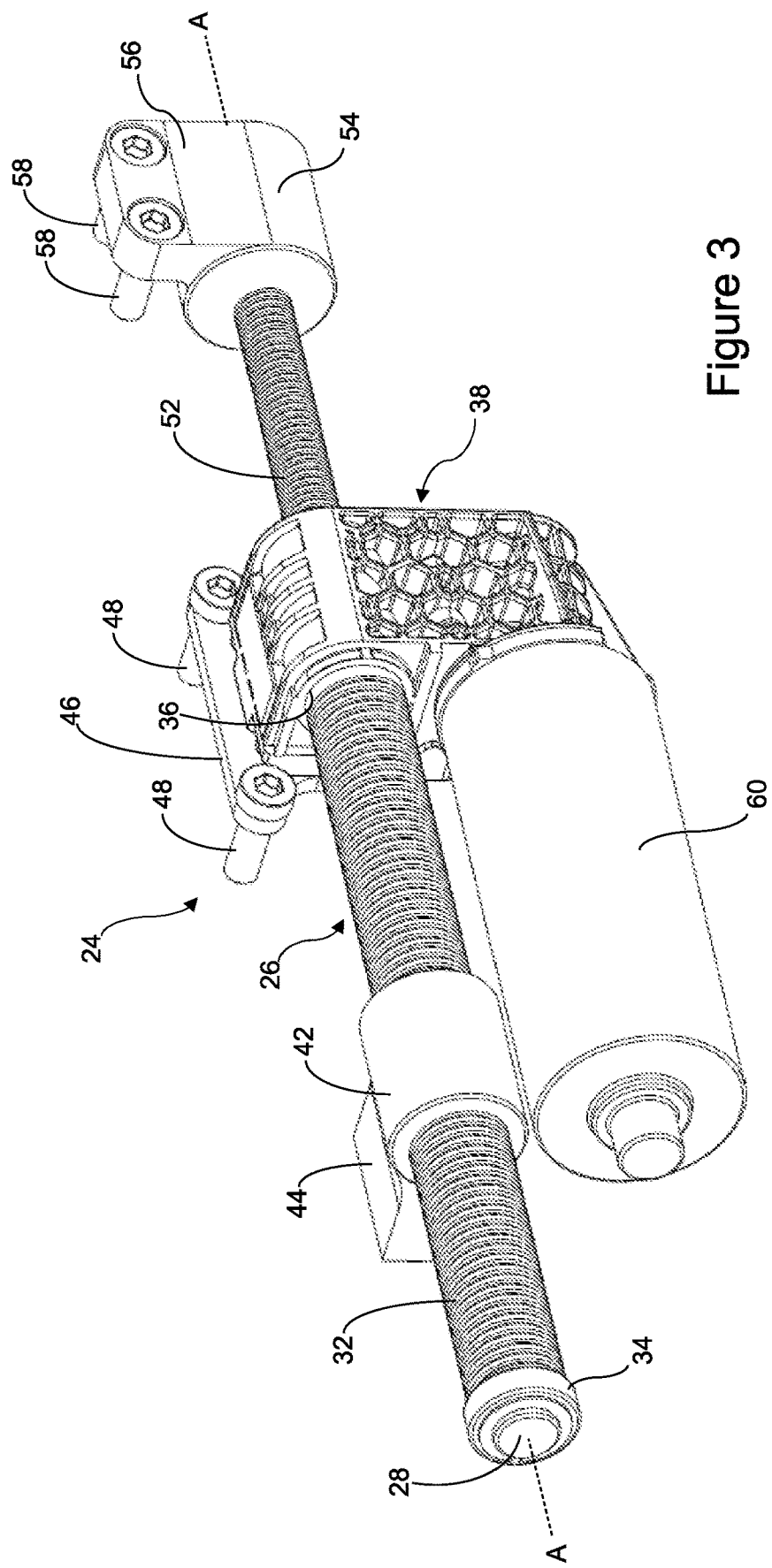
FIG. 3 is a perspective view illustrating the adjustment mechanism of the steering column assembly of FIG. 1.
Figure 4:
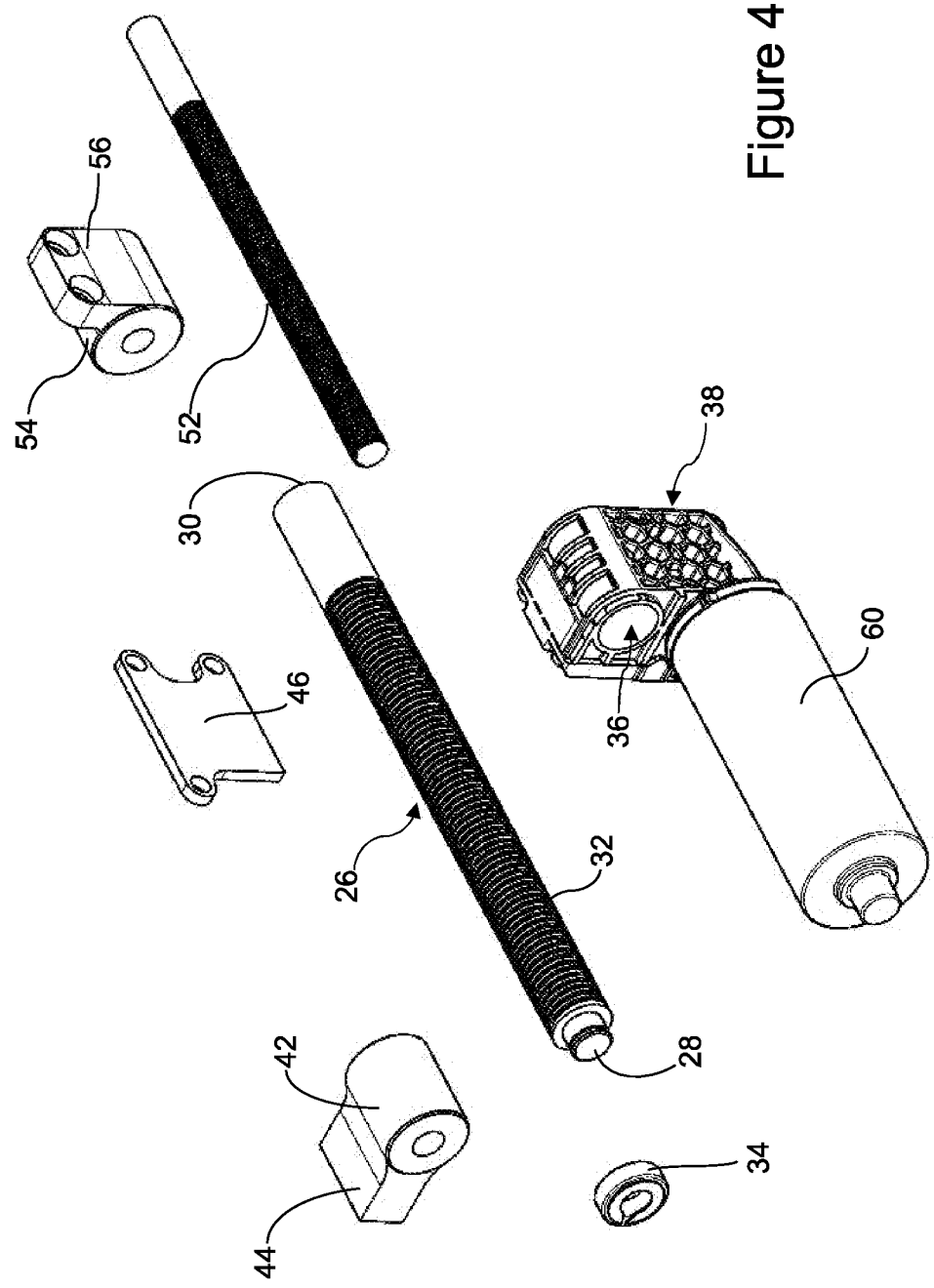
FIG. 4 is an exploded perspective view of the adjustment mechanism of FIG. 2.

FIG. 2 also shows that a much smaller packaging space (indicated at A) is required by the actuating mechanism 24, as compared with the packaging space (indicated at B) required by a typical prior art actuating mechanism.

The use of a single leadscrew 26 to which the first and second displacement members 42, 54 are screw-threadedly mounted also results in reduced bending of the mechanism during a crash, as the mechanism lies in one axis. In addition, the compact nature of the adjusting mechanism results in smaller lateral distances between the leadscrew 26 and the mounting points of the outer, intermediate and inner tubes 16, 18, 20, resulting in a lower bending moment in the event of a crash, as compared with prior art arrangements.

Figure 7:
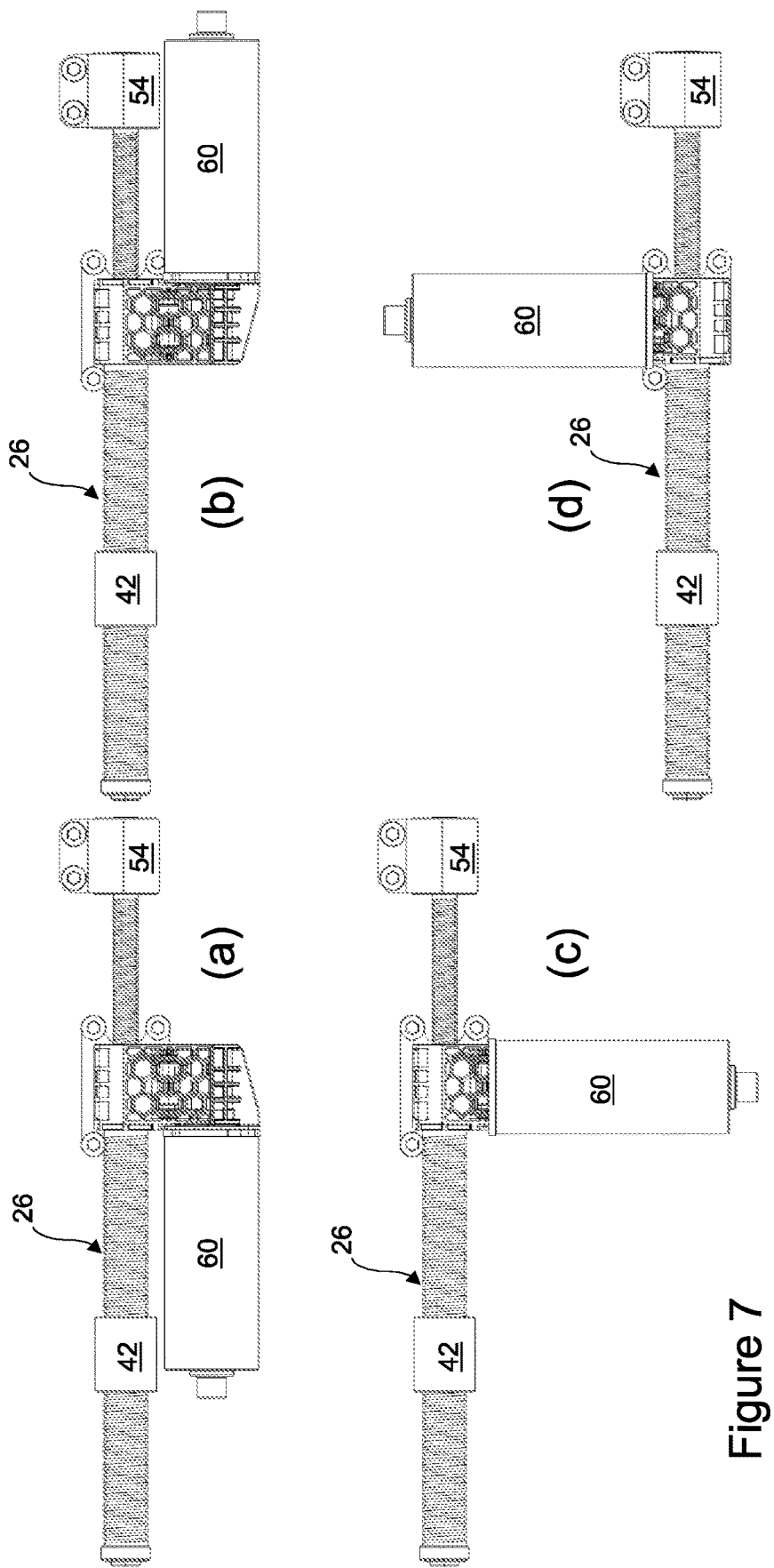
FIGS. 7 (a) to (d) are side views of the adjustment mechanism of FIG. 2, illustrating different mounting options for a motor.

The arrangements illustrated in FIGS. 7(a) to (d) show variations of the exemplary arrangement of FIG. 1, having different orientations of the motor 60. The arrangement shown in FIG. 7(a) is identical to the exemplary arrangement of FIG. 1, with the rotational axis of the motor parallel to the longitudinal axis A-A of the leadscrew 26. In FIG. 7(b), the longitudinal axis of the motor 60 is still parallel to the longitudinal axis A-A of the leadscrew 26, but has been rotated through 180°. In FIG. 7(c), the longitudinal axis of the motor 60 is perpendicular to the longitudinal axis A-A of the leadscrew 26 and extends downwardly. In FIG. 7(d), the longitudinal axis of the motor 60 is also perpendicular to the longitudinal axis A-A of the leadscrew 26 but extends upwardly. The different possible positions of the motor 60 allow flexibility in positioning the column assembly 10 within the available packaging space within a vehicle.

Figure 8:
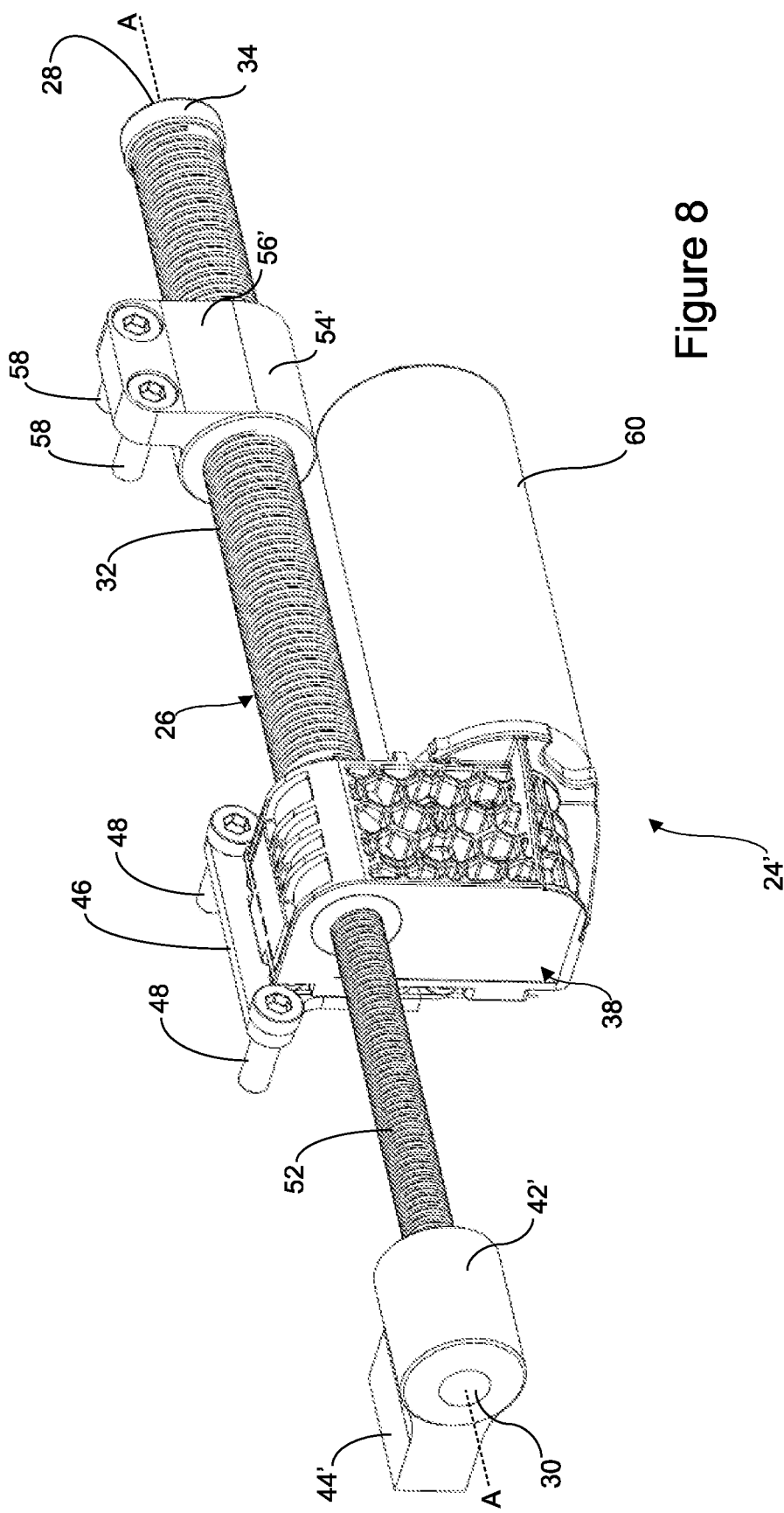
FIG. 8 is a perspective view of the adjustment mechanism of a second embodiment of steering column assembly for a vehicle in accordance with the present disclosure, which is a variation of the first exemplary arrangement.

A second exemplary arrangement of the present disclosure is illustrated in FIG. 8. The construction of this exemplary arrangement is very similar to that of the first exemplary arrangement and the same reference numerals used for the first embodiment denote corresponding features. The features which are modified with respect to the first exemplary arrangement are given the same reference numeral but with the addition of a prime (').

The only significant differences as compared with the first exemplary arrangement are that (a) mechanism is rotated through 180° so that the threaded bar 52 extends in the opposite direction, (b) a threaded sleeve 42' is fixedly mounted to the free end of the threaded bar 52 and is secured to the innermost tube 20 by means of a laterally projecting lug 44' and (c) a threaded collar 54' is screw-threadedly mounted on the exterior of the leadscrew 26 and is secured to the outermost tube 16 by two bolts 58 passing through a mounting lug 56' projecting upwardly from the threaded collar 54'.

However, operation of the motor 60 results in the same adjustment of the relative positions of the outer, intermediate and inner tubes 16, 18, 20 as described for the first exemplary arrangement.

Figure 9:
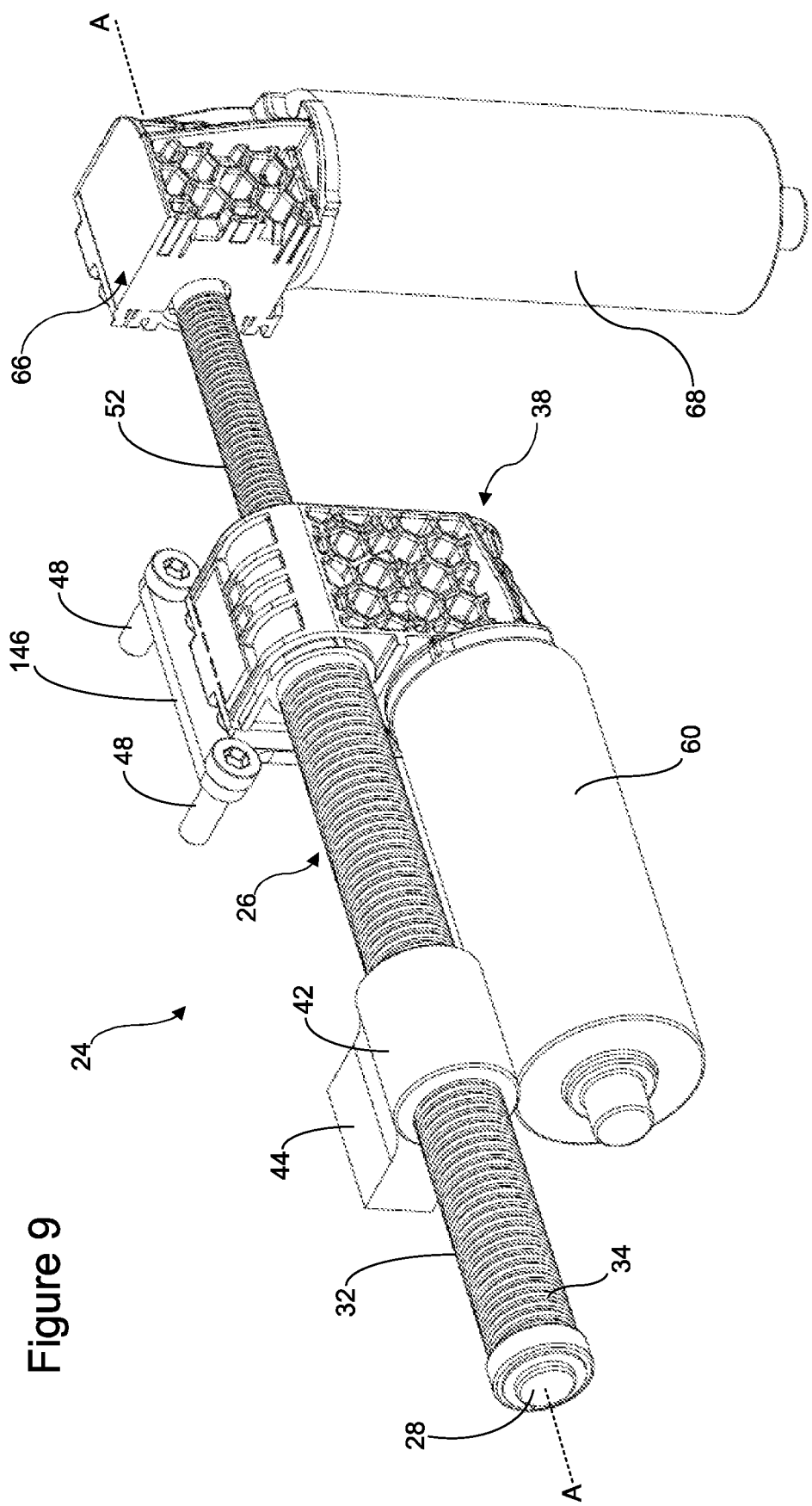
FIG. 9 is a perspective view of the adjustment mechanism of a third exemplary arrangement of a steering column assembly for a vehicle in accordance with the present disclosure, which is a further variation of the first exemplary arrangement.

A third exemplary arrangement of the present disclosure is illustrated in FIG. 9. This exemplary arrangement is very similar to the first exemplary arrangement, and corresponding features are identified with the same reference numerals.

The only significant difference as compared with the first exemplary arrangement is that the threaded collar 54 of the first exemplary arrangement is replaced with a gearbox 66 which is secured to the outermost tube 16 and in which one end of the threaded bar 52 is rotatably mounted. The gearbox 66 carries a second electric motor 68 which, in conjunction with the gearbox 66 can be operated to rotate the threaded bar 52 in both directions.

As a consequence, by operating the first and second motors 60, 68 together, the relative speed of rotation between the threaded bar 52 and the leadscrew 26 can be increased significantly, resulting in faster relative displacement between the outermost tube 16 and the intermediate tube 18, which in turn allows the steering column assembly 10 to be extended and retracted more quickly.

Figure 10:
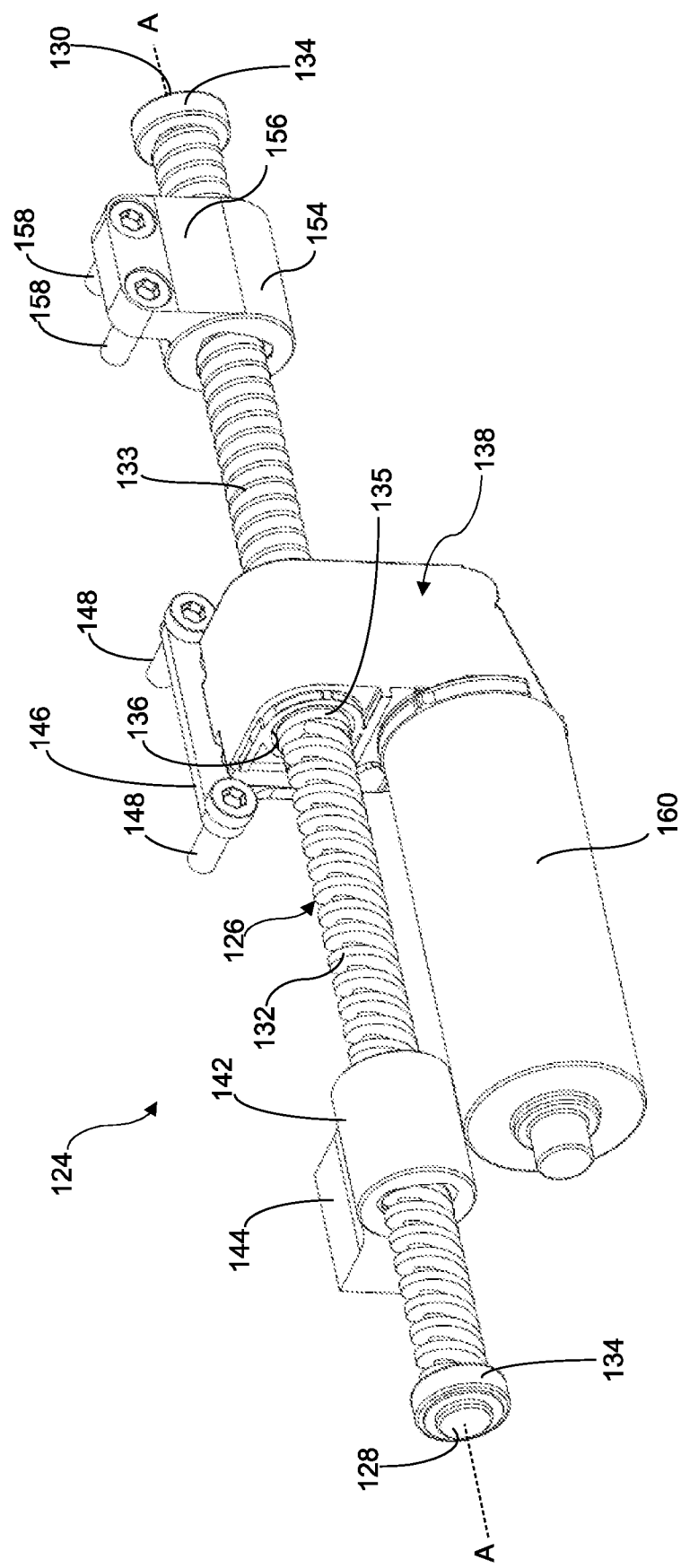
FIG. 10 is a perspective view of the adjustment mechanism of the adjustment mechanism of a fourth exemplary arrangement of steering column assembly in accordance with the present disclosure.

An alternative mechanism 124 for displacing the outermost, intermediate and innermost tubes 16, 18, 20 is illustrated in FIG. 10. The mechanism comprises an elongate, straight leadscrew 126 having a front end 128 and a rear end 130. One half of the leadscrew 126 is provided with a helical screw thread 132 and the other half of the leadscrew 126 is provided with an oppositely-handed helical screw thread 133. Annular, resiliently deformable end stops 134 (e.g. made from rubber) are mounted at the front end 128 of the leadscrew and the rear end 130 of the leadscrew. A central, unthreaded portion 135 of the leadscrew 126 between the two helical screw threads 132, 133 is rotatably mounted in a tubular recess 136 of a gearbox housing 138.

An internally threaded sleeve 142 is screw-threadedly mounted on the first helical screw thread 132 and has a laterally extending lug 144 (which, in use, extends through a longitudinal slot in the intermediate tube 18) by which the threaded sleeve is attached to the innermost tube 20. As in the first exemplary arrangement, the gearbox housing 138 is attached to a mounting plate 146 which in turn is securely attached to the intermediate tube 18 by means of two securing bolts 148.

A tubular collar 154 is screw-threadedly mounted on the second helical screw thread 133. The collar 154 has an upwardly projecting securing lug 156 and is attached to the outermost tube 16 by two securing bolts 158 passing through the securing lug 156.

An electric motor 160 is secured to the gearbox housing 138 and is arranged to rotate the leadscrew 126 via the gearbox 138, as will be explained. The gearbox housing 138 is identical to the gearbox housing 38 of the previous embodiments but the honeycomb structure is not shown in FIG. 10.

As mentioned previously, (a) the threaded sleeve 142 which is screw-threadedly mounted on the first thread 132 of the leadscrew 126 is secured to the innermost tube 20, (b) the gearbox 138 is secured to the intermediate tube 18 and (c) the tubular collar 154 which is screw-threadedly mounted on the second thread 133 of the leadscrew 126 is secured to the outermost tube 16. The threaded sleeve 142 and the tubular collar 154 are thereby prevented from rotating. In addition, as mentioned previously, the first and second helical screw threads 132, 133 are oppositely-handed (i.e. one is a right-hand thread and the other is a left-hand thread). Consequently, as the motor 160 is operated in a first direction, rotation of the leadscrew 126 causes the threaded sleeve 142 to move along the first helical thread 132 towards the end stop 134 at the first end 128 of the leadscrew 126 and causes the tubular collar 154 to be moved along the second helical thread 133 in the opposite direction away from the gearbox 138 towards the end stop 134 at the second end 130 of the leadscrew 126. Conversely, as the motor 160 is operated in the opposite direction, the threaded sleeve 142 is displaced along the first helical thread 132 away from the end stop 134 and the tubular collar 154 which is displaced along the second helical thread 132 towards the gearbox 138. The outermost tube 16 is secured to the vehicle, and therefore operation of the motor causes the intermediate tube 18 to telescope in and out of the innermost tube 16 and simultaneously causes the innermost tube 18 to telescope in and out of the intermediate tube 18.

As for the previous exemplary arrangements, this mechanism allows the position of the steering column 12, and therefore of the steering wheel which is connected to the steering column 12 in use, to be adjusted between a withdrawn, stowed condition and an extended, deployed condition. The position of the steering wheel in the extended, deployed condition can also be adjusted to suit the driver of the vehicle.

The disclosure is not restricted to the details of the foregoing exemplary arrangements.

The invention claimed is:

1. A steering column assembly comprising:
   a housing having outer, intermediate, and inner elongate, telescopically mounted housing portions movable relative to one another along an adjustment axis;
   a steering column rotatably mounted in the inner elongate housing portion and being configured at one end for attachment of a steering member;
   a leadscrew rotatably mounted on the intermediate housing portion, the leadscrew defining an externally threaded portion and an internally threaded bore portion, wherein the externally threaded portion and the internally threaded portion are of opposite handedness;
   a motor for rotating the leadscrew;
   a first displacement member screw-threadedly mounted to the externally threaded portion of the leadscrew and connected to one of the outer and inner elongate housing portions; and
   a second displacement member screw-threadedly mounted to connected to the other of the outer and inner elongate housing portions;
   a threaded rod connected to the second displacement member, the threaded rod threadedly received within the internally threaded bore portion of the leadscrew;
   whereby rotation of the leadscrew causes displacement of the first and second displacement members in opposite directions along the adjustment axis, wherein rotation of the leadscrew causes displacement of the threaded rod to displace the second displacement member.

2. A steering column assembly as claimed in claim 1, wherein the threaded rod is prevented from rotating.

3. A steering column assembly as claimed in claim 1, further comprising a second motor for rotating the threaded rod.

4. A steering column assembly as claimed in claim 3, wherein the second motor is mounted on the elongate housing portion to which the threaded rod is connected.

5. A steering column assembly as claimed in claim 4, wherein the first displacement member comprises an internally threaded member mounted on an externally threaded portion of the leadscrew.

6. A steering column assembly as claimed in claim 4, further comprising a gear mechanism connecting the output of the motor to the leadscrew.

7. A steering column assembly as claimed in claim 4, wherein the leadscrew extends parallel to the adjustment axis of the telescopic housing.

8. A steering column assembly as claimed in claim 4, further comprising a securing mechanism securing the outer housing portion to a vehicle.

9. A steering column assembly as claimed in claim 1, wherein the first displacement member comprises an internally threaded member mounted on an externally threaded portion of the leadscrew.

10. A steering column assembly as claimed in claim 1, wherein the leadscrew comprises first and second externally threaded portions.

11. A steering column assembly as claimed in claim 1, further comprising a gear mechanism connecting the output of the motor to the leadscrew.

12. A steering column assembly as claimed in claim 11, wherein the motor is connected to the gear mechanism and the gear mechanism is secured to the intermediate housing portion.

13. A steering column assembly as claimed in claim 1, wherein the leadscrew extends parallel to the adjustment axis of the telescopic housing.

14. A steering column assembly as claimed in claim 1, further comprising a securing mechanism for securing the outer housing portion to a vehicle.

15. A vehicle comprising a steering column assembly as claimed in claim 1.

16. A steering column assembly comprising:
   a housing having outer, intermediate, and inner elongate, telescopically mounted housing portions movable relative to one another along an adjustment axis;
   a steering column rotatably mounted in the inner elongate housing portion and being configured at one end for attachment of a steering member;
   a leadscrew rotatably mounted on the intermediate housing portion, the leadscrew defining an externally threaded portion and an internally threaded bore portion, wherein the externally threaded portion and the internally threaded portion are threaded oppositely;
   a motor for rotating the leadscrew;
   a first displacement member screw-threadedly mounted to the externally threaded portion of the leadscrew and connected to one of the outer and inner elongate housing portions; and
   a second displacement member screw-threadedly connected to the other of the outer and inner elongate housing portions;
   a threaded rod received within the internally threaded bore portion of the leadscrew and connected to the second displacement member, the threaded rod configured to be laterally displaced by rotation of the leadscrew;
   whereby rotation of the leadscrew causes lateral displacement of the first displacement member and the second displacement member in opposite directions along the adjustment axis.

17. A steering column assembly as claimed in claim 16, further comprising a gearbox housing that is configured to retain the motor, the gearbox rotatably connected to the leadscrew.

18. A steering column assembly as claimed in claim 17, wherein the gearbox housing comprises a honeycomb structure.

* * * * *